United States Patent
Yoon et al.

(10) Patent No.: US 8,277,966 B2
(45) Date of Patent: Oct. 2, 2012

(54) DOUBLE WINDING-TYPED ELECTRODE ASSEMBLY

(75) Inventors: Jongmoon Yoon, Daejeon (KR); KiJae Kim, Seoul (KR); Heekook Yang, Daejeon (KR); Inchul Shin, Daejeon (KR); Eun Ji Yoo, Seongnam-si (KR)

(73) Assignee: LG Chem, Ltd., Seoul (KR)

( * ) Notice: Subject to any disclaimer, the term of this patent is extended or adjusted under 35 U.S.C. 154(b) by 780 days.

(21) Appl. No.: 12/301,015

(22) PCT Filed: May 4, 2007

(86) PCT No.: PCT/KR2007/002189
§ 371 (c)(1),
(2), (4) Date: Apr. 30, 2009

(87) PCT Pub. No.: WO2007/132992
PCT Pub. Date: Nov. 22, 2007

(65) Prior Publication Data
US 2009/0305121 A1 Dec. 10, 2009

(30) Foreign Application Priority Data
May 15, 2006 (KR) .................. 10-2006-0043202

(51) Int. Cl.
*H01M 6/10* (2006.01)

(52) U.S. Cl. ......................................................... 429/94
(58) Field of Classification Search ..................... 429/94
See application file for complete search history.

(56) References Cited

U.S. PATENT DOCUMENTS

| | | | |
|---|---|---|---|
| 6,709,785 B2 * | 3/2004 | Lee et al. | 429/153 |
| 2002/0160257 A1 | 10/2002 | Lee et al. | |

FOREIGN PATENT DOCUMENTS

| | | | |
|---|---|---|---|
| JP | 59-29361 | * | 2/1984 |
| JP | 59029361 A | | 2/1984 |
| KR | 2001-0082058 A | | 8/2001 |
| KR | 2001-0082059 A | | 8/2001 |
| KR | 2001-0082060 | * | 8/2001 |
| KR | 2001-0082060 A | | 8/2001 |
| KR | 10-2004-0054201 A | | 6/2004 |
| WO | WO-03/034517 A1 | | 4/2003 |

* cited by examiner

*Primary Examiner* — Joseph Kosack
(74) *Attorney, Agent, or Firm* — Birch, Stewart, Kolasch & Birch, LLP

(57) ABSTRACT

Disclosed herein is a double winding type electrode assembly constructed in a structure in which a cathode and an anode are opposite to each other while a separator is disposed between the cathode and the anode, wherein the electrode assembly is manufactured by preparing a plurality of cell units, each cell unit having a cathode sheet and an anode sheet, of a predetermined size, wound, while a separator is disposed between the cathode sheet and the anode sheet, each cell unit being elliptical in section, and sequentially winding the cell units while arranging the cell units on a long separator sheet.

21 Claims, 11 Drawing Sheets

DOUBLE WINDING-TYPED ELECTRODE ASSEMBLY

FIELD OF THE INVENTION

The present invention relates to a double winding type electrode assembly, and, more particularly, to a double winding type electrode assembly constructed in a structure in which a cathode and an anode are opposite to each other while a separator is disposed between the cathode and the anode, wherein the electrode assembly is manufactured by preparing a plurality of cell units, each cell unit having a cathode sheet and an anode sheet, of a predetermined size, wound, while a separator is disposed between the cathode sheet and the anode sheet, each cell unit being elliptical in section, and sequentially winding the cell units while arranging the cell units on a long separator sheet.

BACKGROUND OF THE INVENTION

As mobile devices have been increasingly developed, and the demand for such mobile devices has increased, the demand for batteries has also sharply increased as an energy source for the mobile devices. Accordingly, much research on batteries satisfying various needs has been carried out.

In terms of the shape of batteries, the demand for prismatic secondary batteries or pouch-shaped secondary batteries, which are thin enough to be applied to products, such as mobile phones, is very high. In terms of the material for batteries, the demand for lithium secondary batteries, such as lithium ion batteries and lithium ion polymer batteries, having high energy density, high discharge voltage, and high output stability, is very high.

Furthermore, secondary batteries may be classified based on the construction of an electrode assembly having a cathode/separator/anode structure. For example, the electrode assembly may be constructed in a jelly-roll (winding) type structure in which long-sheet type cathodes and anodes are wound while separators are disposed respectively between the cathodes and the anodes, a stacking type structure in which pluralities of cathodes and anodes having a predetermined size are successively stacked one on another while separators are disposed respectively between the cathodes and the anodes, or a stacking/folding type structure in which pluralities of cathodes and anodes having a predetermined size are successively stacked one on another, while separators are disposed respectively between the cathodes and the anodes, to constitute a bi-cell or a full-cell, and then the bi-cell or the full-cell is wound. The details of the stacking/folding type electrode assembly are disclosed in Korean Patent Application Publication No. 2001-0082058, No. 2001-0082059, and No. 2001-0082060, which have been filed in the name of the applicant of the present patent application.

However, the conventional electrode assemblies have several problems.

First, the jelly-roll type electrode assembly is manufactured by densely winding long-sheet type cathodes and anodes with the result that the jelly-roll type electrode assembly is circular or elliptical in section. Consequently, stress, generated by the expansion and contraction of the electrodes during the charge and discharge of the electrode assembly, accumulates in the electrode assembly, and, when the stress accumulation exceeds a specific limit, the electrode assembly may be deformed. The deformation of the electrode assembly results in the nonuniform gap between the electrodes. As a result, the performance of the battery is abruptly deteriorated, and the safety of the battery is not secured due to an internal short circuit of the battery. Furthermore, it is difficult to rapidly wind the long-sheet type cathodes and anodes while maintaining uniformly the gap between the cathodes and anodes, and therefore, the productivity is lowered.

Secondly, the stacking type electrode assembly is manufactured by sequentially stacking pluralities of unit cathodes and anodes. As a result, it is additionally necessary to provide a process for transferring electrode plates, which are used to manufacture the unit cathodes and anodes. Furthermore, a great deal of time and effort is required to perform the sequential stacking process, and therefore, the productivity is lowered.

Thirdly, the stacking/folding type electrode assembly considerably makes up for the defects of the jelly-roll type electrode assembly and the stacking type electrode assembly. However, a stacking process is necessary to manufacture the bi-cell or the full-cell. Consequently, the stacking/folding type electrode assembly is not a complete solution.

In conclusion, the jelly-roll type electrode assembly is preferred in the aspect of productivity, and the stacking type electrode assembly and the stacking/folding type electrode assembly are preferred in the aspect of operational performance and safety of the battery. Nevertheless, there is high necessity for a new electrode assembly that is capable of providing higher productivity and operational performance of a battery while making up for the defects of the conventional electrode assemblies.

Especially, a large-sized battery module, which is used for middle- or large-sized devices, such as electric vehicles or hybrid electric vehicles, which have lately attracted much attention, needs a large number of battery cells (unit cells). Furthermore, it is required that the large-sized battery module have a long service life characteristic. Consequently, a new electrode assembly that can solve all the above-mentioned problems is seriously needed.

SUMMARY OF THE INVENTION

Therefore, the present invention has been made to solve the above problems, and other technical problems that have yet to be resolved.

As a result of a variety of extensive and intensive studies and experiments to solve the problems as described above, the inventors of the present invention have developed an electrode assembly constructed in a structure in which winding type cell units, as unit bodies, are wound while the cell units are arranged on a long separator sheet, and found that the double winding type electrode assembly is manufactured with a high productivity equivalent to that of the conventional jelly-roll type electrode assembly, and, in addition, the double winding type electrode assembly exhibits a high operational efficiency and safety equivalent to the conventional stacking type or stacking/folding type electrode assembly even after the electrode assembly according to the present invention is used for a long period of time. The present invention has been completed based on these findings.

In accordance with one aspect of the present invention, the above and other objects can be accomplished by the provision of a double winding type electrode assembly constructed in a structure in which a cathode and an anode are opposite to each other while a separator is disposed between the cathode and the anode, wherein the electrode assembly is manufactured by preparing a plurality of cell units, each cell unit having a cathode sheet and an anode sheet, of a predetermined size, wound, while a separator is disposed between the cathode sheet and the anode sheet, each cell unit being elliptical in section, and sequentially winding the cell units while arranging the cell units on a long separator sheet.

The electrode assembly according to the present invention is basically based on the winding structure, and therefore, it is possible to manufacture the electrode assembly according to the present invention with a higher productivity than the stacking structure. On the other hand, each cell unit is constructed in a structure in which the cathode and the anode are wound by the reduced number of winding times, with the result that stress, generated by the expansion and contraction of the electrodes during the continuous charge and discharge of the electrode assembly, does not accumulate in the electrode assembly, and therefore, the electrode assembly according to the present invention is not deformed even after the electrode assembly is used for a long period of time. For the jelly-roll type electrode assembly, the number of winding times of the electrode sheets is very large, and therefore, a large frictional force is generated in the longitudinal direction of the electrode sheets during the winding process. Furthermore, the stress, generated in the longitudinal direction of the electrode sheets by the expansion and contraction of the electrodes, is not removed due to the frictional force but accumulates in the electrode assembly. However, each cell unit of the present invention is constructed in a structure in which the electrode sheets are wound by the reduced number of winding times. Consequently, only a small frictional force is generated in the longitudinal direction of the electrode sheets during the winding process, and therefore, the stress accumulation does not occur.

The cell units are small-sized winding type unit cells, which are elliptical in section. The cell units may be manufactured by winding the cell units in a circular shape in section and then compressing the wound cell units such that the cell units are formed in the elliptical shape, or winding the cell units in an elliptical shape from the beginning. Preferably, the separator, disposed between the cathode and the anode, extends longer than the outer winding end of each electrode, such that the occurrence of a short circuit due to the contact between the cathode and the anode is prevented during the winding process or the operation of the electrode assembly. The elliptical sectional structure is substantially similar to a thin stacked sheet structure.

The number of winding times of each cell unit is, preferably 1 to 5, more preferably 2 to 4, based on the number of bending times of the respective electrode sheets in the elliptical structure. When the number of winding times of each cell unit is too large, the stress accumulation may occur, during the charge and discharge of the electrode assembly, due to the increase of the frictional force in the longitudinal direction of the electrode sheets.

When the winding process is performed to manufacture of each cell unit, the inside winding end of the cathode and the inside winding end of the anode may be located at approximately the same winding start point, or the inside winding end of the cathode and the inside winding end of the anode may be opposite to each other at the winding start point. Here, the term "inside winding end" means the end, of each electrode sheet, located at the inside of the each cell unit when each electrode sheet is wound in the circular or elliptical shape. Whereas, the term "outside winding end" means the end, of each electrode sheet, located at the outside of the each cell unit when each electrode sheet is wound.

The cell units may be constructed in various structures depending upon the location of the outside winding ends of the electrode sheets constituting each cell unit. For example, each cell unit may be a cell unit constructed in a structure in which the upper end electrode and the lower end electrode have different polarities (hereinafter, referred to as an 'A-type cell unit') or a cell unit constructed in a structure in which the upper end electrode and the lower end electrode have the same polarity (hereinafter, referred to as an 'B-type cell unit').

The A-type cell unit may be constructed in a structure in which the outside winding end of the cathode and the outside winding end of the anode are located on the same plane or a structure in which the outside winding end of the cathode and the outside winding end of the anode are not located on the same plane. Preferably, opposite round sides of each cell unit are surrounded by the anode sheet. This is because the anodes occupy a relatively large area, when a plurality of cell units are stacked in a cathode/anode facing structure, and therefore, when the electrode assembly according to the present invention is used, for example, in a lithium secondary battery, the dendritic growth of lithium metal at the anode is maximally retrained during the charge and discharge of the lithium secondary battery.

The B-type cell unit may be constructed in a structure in which the anode forms the outer winding surface or a structure in which the cathode forms the outer winding surface. Preferably, however, the outside winding end of the anode extends longer than the outside winding end of the cathode such that the dendritic growth of lithium metal is retrained.

As described above, the cell units are located on the long separator sheet, and are then wound, such that the cathodes and the anodes face each other at the interfaces of the cell units, to manufacture a double winding type electrode assembly according to the present invention.

In a preferred embodiment, the first cell unit, with which the winding process is initiated, and the second cell unit, among the cell units arranged on the separator sheet, are spaced apart from each other by a length sufficient such that the lower end electrode of the first cell unit is brought into contact with the upper end electrode of the second cell unit after the outer surface of the first cell unit is completely covered by the separator sheet during the winding process. Specifically, the first cell unit and the second cell unit are located on the separator sheet while the first cell unit and the second cell unit are spaced apart, by a distance corresponding to the width of at least one cell unit, from each other, and then the process for winding the cell units is performed.

As a result, the cell units are wound in a structure in which the upper end electrode of the first cell unit and the upper end electrode of the third cell unit have opposite polarities, the lower end electrode of the second cell unit and the upper end electrode of the fourth cell unit have opposite polarities, and the lower end electrode of the third cell unit and the upper end electrode of the fifth cell unit have opposite polarities. Based on this winding structure, it is possible to arrange the cell units in various structures as described above.

Preferably, the electrode assembly is constructed in a structure in which the lower end electrode of the last cell unit on the separator sheet ($n^{th}$ cell unit) and the lower end electrode of the $n-1^{th}$ cell unit adjacent to the $n^{th}$ cell unit are anodes. The lower end electrode of the last cell unit and the lower end electrode of the $n-1^{th}$ cell unit form the outer surface of the electrode assembly, i.e., the upper and lower end surfaces of the electrode assembly. Consequently, it is possible to maximally restrain the dendritic growth as previously described.

In this connection, several exemplary arrangements of the cell units are possible as follows.

In a first exemplary arrangement, the first cell unit and the second cell unit are A-type cell units whose upper end electrodes are cathodes (hereinafter, referred to as 'Ac-type cell units'), the third cell unit is an A-type cell unit whose upper end electrode is an anode (hereinafter, referred to as an 'Aa-type cell unit'), the fourth cell unit and the following cell units are sequentially disposed in a structure in which the Ac-type cell units and the Aa-type cell units are alternately arranged, and the $n^{th}$ cell unit is a B-type cell unit whose outer surface is an anode (hereinafter, referred to as a 'Ba-type cell unit').

In a second exemplary arrangement, the first cell unit and the second cell unit are Aa-type cell units, the third cell unit is an Ac-type cell unit, the fourth cell unit and the following cell units are sequentially disposed in a structure in which the Aa-type cell units and the Ac-type cell units are alternately arranged, the $n-1^{th}$ cell unit is a Ba-type cell unit, and the $n^{th}$ cell unit is an Ac-type cell unit.

In a third exemplary arrangement, the first cell unit is a Ba-type cell unit, the second cell unit and the third cell unit are B-type cell units whose outer surfaces are cathodes (hereinafter, referred to as 'Bc-type cell units'), the fourth cell unit and the following cell units are sequentially disposed in a structure in which the Bc-type cell units and the Ba-type cell units are alternately arranged two by two, and the $n-1^{th}$ cell unit and the $n^{th}$ cell unit are Ba-type cell units.

However, other arrangements are also possible, and they must be interpreted to be within the scope of the present invention.

The number of cell units, wound while being located on the separator sheet, may be decided depending upon various factors, such as the number of winding times of each cell unit and the desired capacity of each cell unit. Preferably, the number of cell units is 2 to 10.

The separator sheet is not particularly restricted so long as the separator sheet is insulative and is constructed in a porous structure to allow the movement of ions like the separator disposed between the cathode and the anode of each cell unit.

In a preferred embodiment, the cell units are bonded to the separator sheet before the commencement of the winding process, such that the process for winding the cell units is easily performed on the separator sheet. At this time, the bonding of the cell units to the separator sheet may be accomplished, for example, by applying a solution, having a polymer, such as PVDF, HFD, PMMA, PEO, or PMMA, which is easily laminated at a low glass temperature (TG) and electrochemically stable at a potential range of 0 to 5 V, dissolved in a predetermined solvent, to a separator and drying the solution applied to the separator, to manufacture a separator sheet coated with a binder, placing cell units on the separator sheet, and applying predetermined pressure and heat to the cell units and the separator sheet.

The binder-coated separator sheet may be used as the separator material of each cell unit. The binder-coated separator sheet serves to maintain the elliptical sectional shape of each cell unit, during the manufacture of the electrode assembly, due to the coupling force between the binder-coated separator sheet and the electrodes.

The electrode assembly manufactured as described above may be applied to an electrochemical cell to generate electricity through the electrochemical reaction between the cathode and the anode. Typically, the electrode assembly is applied to a secondary battery.

The secondary battery is constructed in a structure in which an electrode assembly, which can be charged and discharged, is mounted in a battery case, while the electrode assembly is impregnated with an ion-containing electrolyte. In a preferred embodiment, the secondary battery is a lithium secondary battery.

Recently, the lithium secondary battery has attracted much attention as a power source of large-sized devices as well as small-size mobile devices. When the lithium secondary battery is applied to such devices, it is preferable for the lithium secondary battery to be light in weight. Preferably, a solution for reducing the weight of the secondary battery is to mount the electrode assembly in a pouch-shaped case made of an aluminum laminate sheet.

Furthermore, when the secondary battery is used as a power source for middle- or large-sized devices, as described above, it is preferable that the deterioration of the operational performance of the secondary battery be maximally restrained even after the secondary battery is used for a long period of time, the service life characteristics of the secondary battery be excellent, and the secondary battery be mass-produced with low costs. In this connection, the secondary battery including the electrode assembly according to the present invention is preferably used in a middle- or large-sized battery module as a unit cell.

The middle- or large-sized battery module is manufactured by connecting a plurality of unit cells in series or in series/parallel with each other such that the middle- or large-sized battery module provides high output and large capacity. The structure of the middle- or large-sized battery module is well known in the art to which present invention pertains, and therefore, a related description thereof will not be given.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Now, preferred embodiments of the present invention will be described in detail with reference to the accompanying drawings. It should be noted, however, that the scope of the present invention is not limited by the illustrated embodiments.

Figure 1:
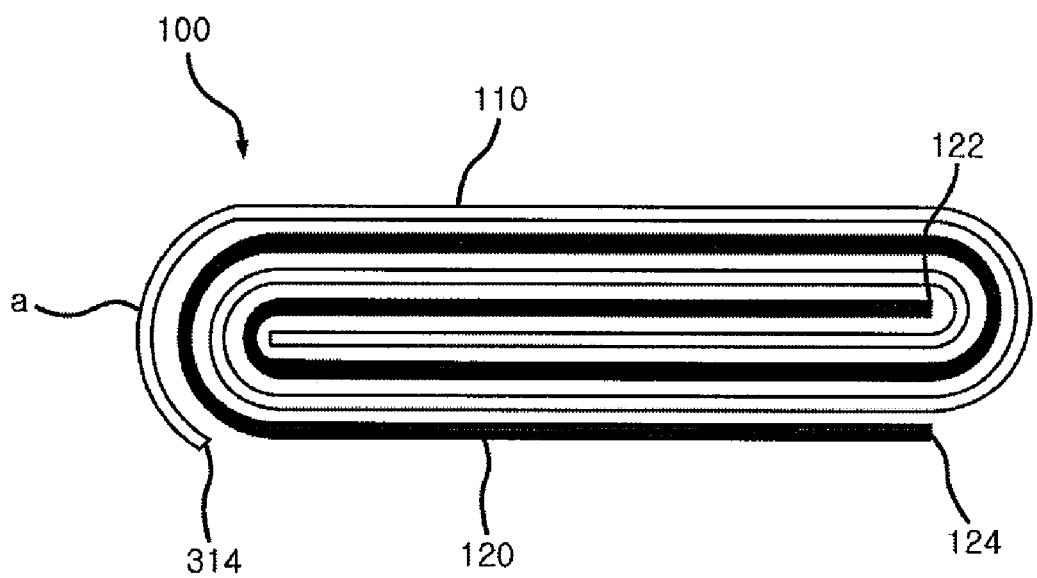
FIGS. 1 to 4 are vertical sectional views illustrating exemplary A-type cell units that can be used in an electrode assembly according to an embodiment of the present invention.
Figure 2:
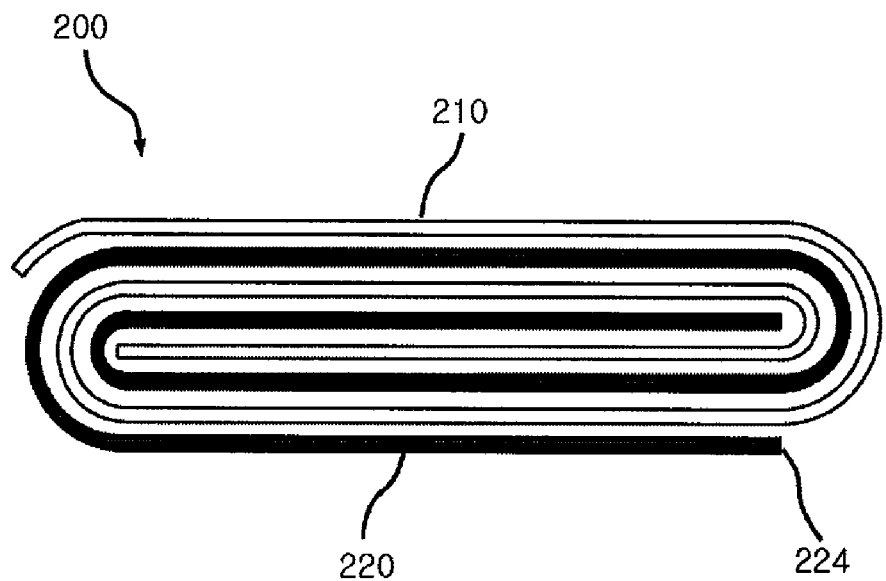
Figure 3:
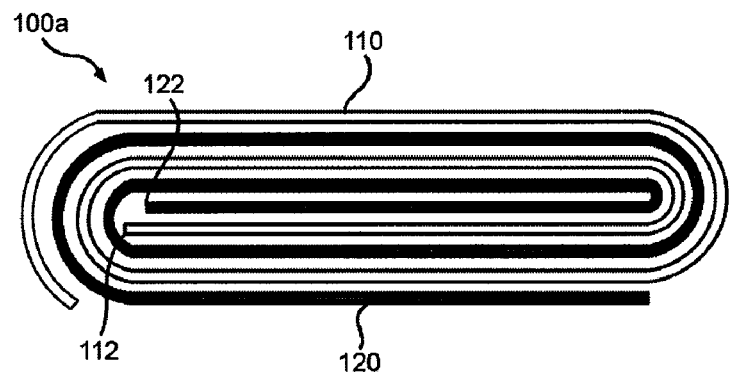
Figure 5:
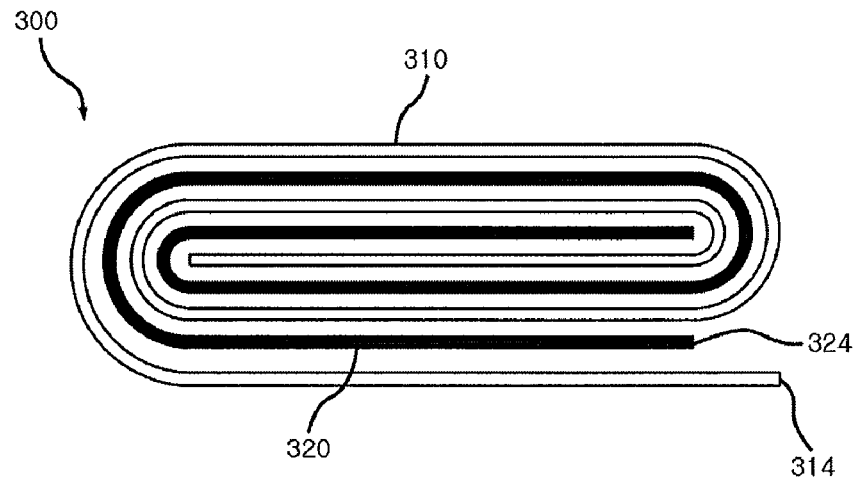
FIGS. 5 to 8 are vertical sectional views illustrating exemplary B-type cell units that can be used in an electrode assembly according to an embodiment of the present invention.
Figure 6:
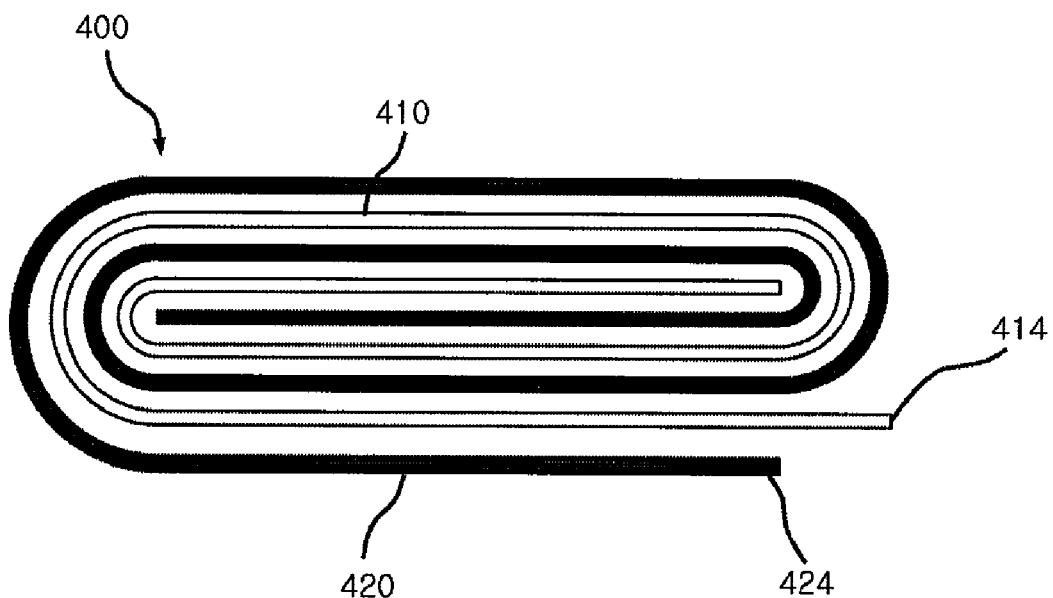
Figure 7:
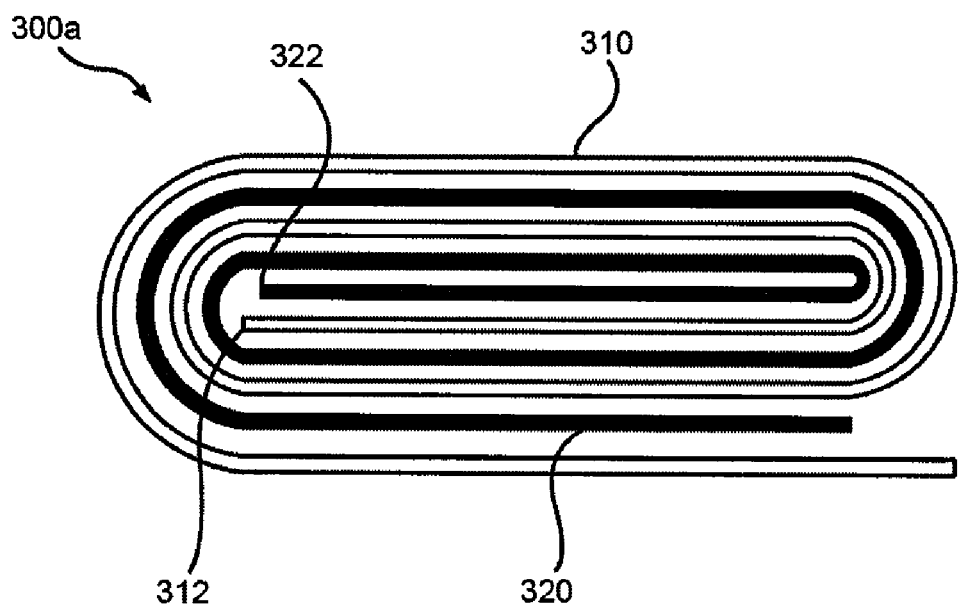

FIGS. 1 to 3 are vertical sectional views typically illustrating exemplary A-type cell units that can be used in an electrode assembly according to an embodiment of the present invention, and FIGS. 5 to 7 are vertical sectional views typically illustrating exemplary B-type cell units that can be used in an electrode assembly according to an embodiment of the present invention. For convenience of description, separators, which are disposed respectively between cathodes and anodes, are omitted from the accompanying drawings. In addition, although the cell units, which are elliptical in section, are constructed in a substantially thin stacked sheet structure, as previously described, the cell units are exaggeratingly shown in the accompanying drawings for easy understanding.

Referring to these drawings, cell units 100, 100a, 200, 300, 300a, and 400 are constructed in a flat elliptical structure in section. The cell units 100, 100a, 200, 300, 300a, and 400 have electrode sheets, which are wound three or four times based on the number of bending times of the respective electrode sheets. Consequently, a large frictional force is not generated in the longitudinal direction of the electrode sheets, as compared to the conventional jelly-roll type electrode assembly, and therefore, stress accumulation does not occur during the charge and discharge of the electrode assembly.

Referring to FIG. 1, the cell unit 100 is constructed in a structure in which the inside winding end 122 of an anode 110 is opposite to the inside winding end of a cathode 120 at the winding start point.

As in the cell unit 100a of FIG. 3, on the other hand, the inside winding end 112 of the anode 110 and the inside winding end 122 of the cathode 120 may be located at approximately the same winding start point. At this time, the inside winding end 112 of the anode 110 extends longer than the inside winding end 122 of the cathode 120 so as to further restrain the dendritic growth of lithium metal, as previously described. Also, no active material is applied to the extension region.

Figure 4:
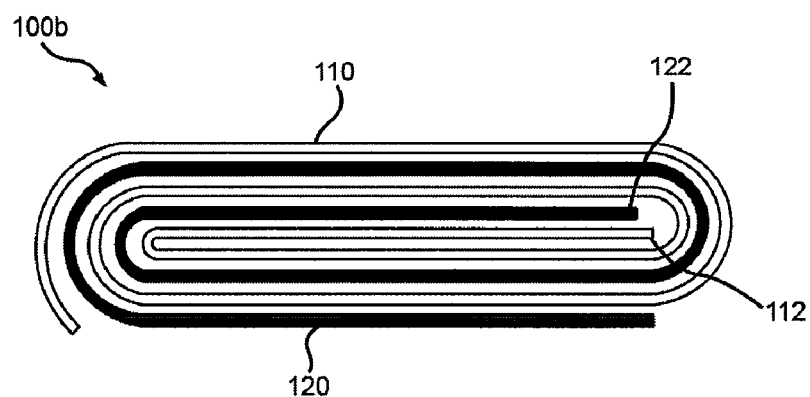

Although the winding start points are located at the same position, however, as in the cell unit 100b of FIG. 4, the inside winding end 112 of the anode 110 may extend longer than the inside winding end 122 of the cathode 120, while the anode 110 is partially overlapped at the winding start region.

Figure 8:
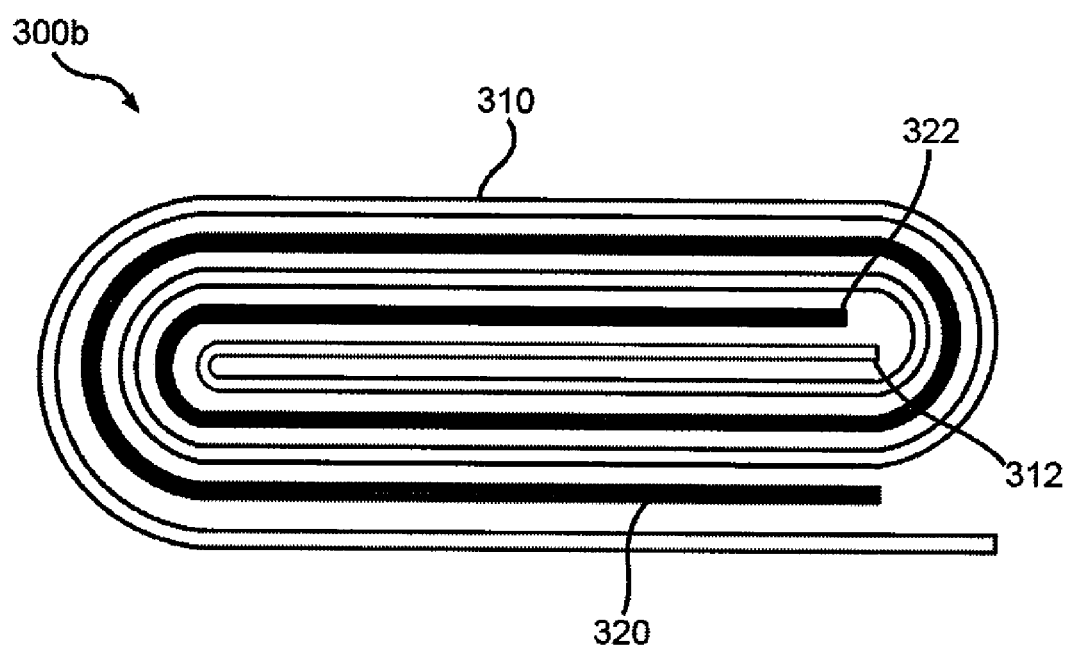

The winding structure of the cell unit may be confirmed through the cell unit 300a of FIG. 7 and the cell unit 300b of FIG. 8, both of which are modifications of the cell unit 300 of FIG. 5. Specifically, the inside winding end 312 of an anode 310 and the inside winding end 322 of a cathode 320 are located at approximately the same winding start point, while the inside winding end 312 of the anode 310 extends longer than the inside winding end 322 of the cathode 320. However, the cathode 320 may be partially overlapped at the winding start region, as shown in FIG. 7, or the anode 310 may be partially overlapped at the winding start region, as shown in FIG. 8.

On the other hand, the cell units 100, 200, 300, and 400 may be constructed in various structures based on the location of the outside winding ends of the electrode sheets constituting the cell units 100, 200, 300, and 400.

First, the A-type cell unit 100 of FIG. 1 and the A-type cell unit 200 of FIG. 2 are constructed in a structure in which the upper end electrode and the lower end electrode have different polarities. Specifically, the A-type cell unit 100 is constructed in a structure in which the outside winding ends 114 and 124 of the anode 110 and the cathode 120 are located on the same plane, whereas the A-type cell unit 200 is constructed in a structure in which the outside winding ends 214 and 224 of the anode 210 and the cathode 220 are not located on the same plane. Opposite round sides a of the A-type cell unit 100 are surrounded by the anode sheet 110, and therefore, it is possible to further restrain the dendritic growth of lithium metal.

On the other hand, the B-type cell unit 300 of FIG. 5 and the B-type cell unit 400 of FIG. 6 are constructed in a structure in which the upper end electrode and the lower end electrode have the same polarity. Specifically, the Ba-type cell unit 300 is constructed in a structure in which the anode 310 forms the outer winding surface, whereas the Bb-type cell unit 400 is constructed in a structure in which the cathode 420 forms the outer winding surface. In the B-type cell units 300 and 400, the outside winding ends 314 and 414 of the anodes 310 and 410 extend longer than the outside winding ends 324 and 424 of the cathodes 320 and 420.

Separators (not shown) of the cell units 100, 200, 300, and 400 extend at least longer than the outside winding ends 314 and 414 of the anodes 310 and 410 so as to prevent the occurrence of a short circuit due to the contact between the cathodes and the anodes. Also, the separators, the cathodes, and the anodes are preferably bonded to each other using a specific binder so as to maintain the wound state of the respective cell units 100, 200, 300, and 400.

FIGS. 9 to 12 are typical views illustrating various arrangements of cell units when manufacturing an electrode assembly according to the present invention.

Figure 9:
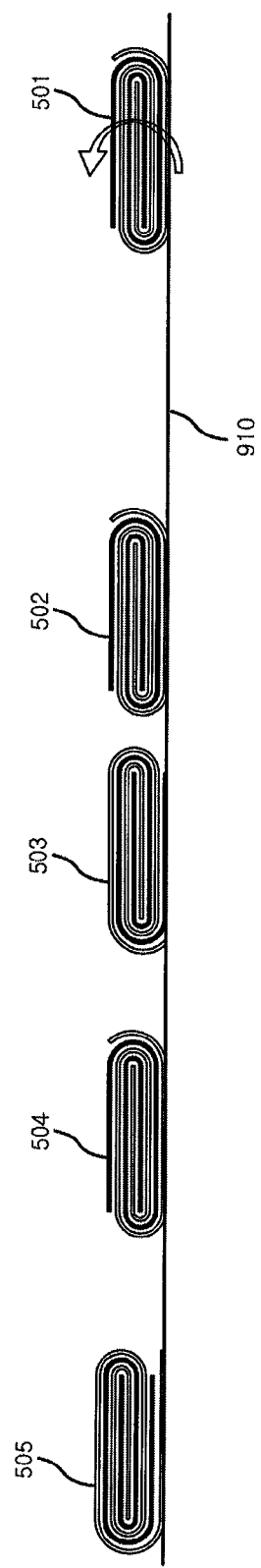
FIGS. 9 to 12 are typical views illustrating various arrangements of cell units when manufacturing an electrode assembly according to the present invention.

Referring first to FIG. 9, cell units are arranged on a long separator sheet, and then the cell units are sequentially wound from the right-side cell unit, so as to manufacture an electrode assembly.

The first cell unit 501 and the second cell unit 502 are located on the separator sheet while the first cell unit 501 and the second cell unit 502 are spaced apart by at least a distance corresponding to the width of one cell unit from each other. Consequently, when the outer surface of the first cell unit 510 is completely covered by the separator sheet 910 according to the winding operation, the lower end electrode of the first cell unit 501 is brought into contact with the upper end electrode of the second cell unit 502.

During the sequential stacking process through the winding operation, the application length of the separator sheet 910 increases. For this reason, the cell units 502, 503, 504, and 505 are arranged such that the distance between the respective cell units 502, 503, 504, and 505 is gradually increased in the winding direction.

Also, during the stacking process, the respective cell units are constructed such that the cathodes and the anodes face each other at the stacked interfaces. Specifically, the first cell unit 501 and the second cell unit 502 are Ac-type cell units whose upper end electrodes are cathodes, the third cell unit 503 is an Aa-type cell unit whose upper end electrode is an anode, the fourth cell unit 504 is an Ac-type cell unit, and the final fifth cell unit 505 is a B-type anode cell unit whose outer surface is an anode.

Figure 10:
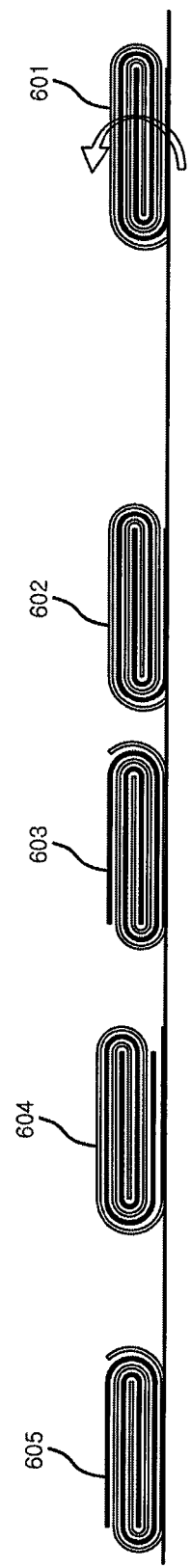

Referring to FIG. 10 illustrating another example, the first cell unit 601 and the second cell unit 602 are Aa-type cell units, the third cell unit 603 is an Ac-type cell unit, the fourth cell unit 604 is a B-type anode cell unit, and the final fifth cell unit 605 is an Ac-type cell unit.

Figure 11:
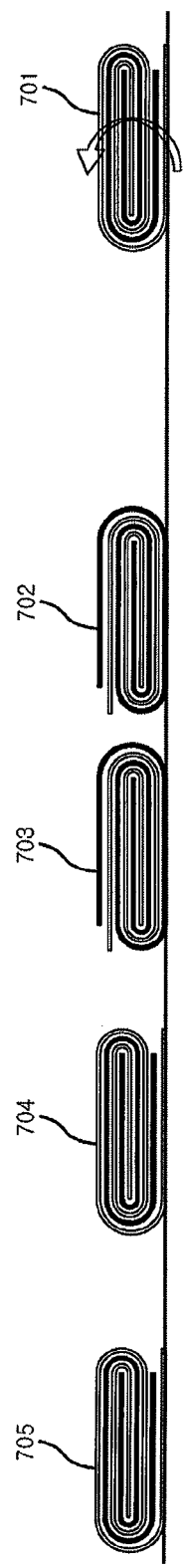

Referring to FIG. 11 illustrating a further example, the first cell unit 701 is a Ba-type cell unit, the second cell unit 702 and the third cell unit 703 are Bc-type cell units, the fourth cell unit 704 is a Ba-type cell unit, and the final fifth cell unit 705 is a Ba-type cell unit.

Figure 12:
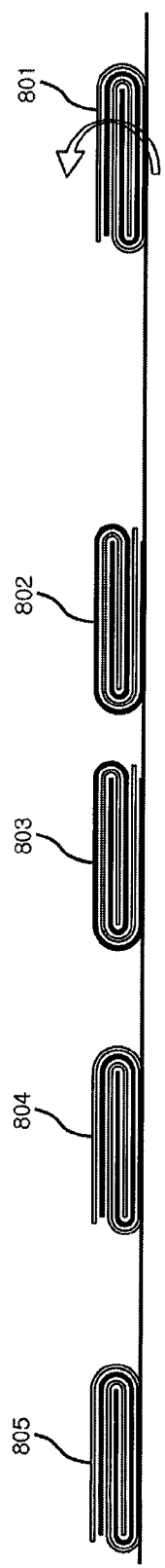

The arrangement of FIG. 12 is the same as the arrangement of FIG. 11; however, the respective cell units 801, 802, 803, 804, and 805 are wound by a reduced number of winding times, specifically, the number of winding times which is one time less than that of FIG. 11.

Figure 13:
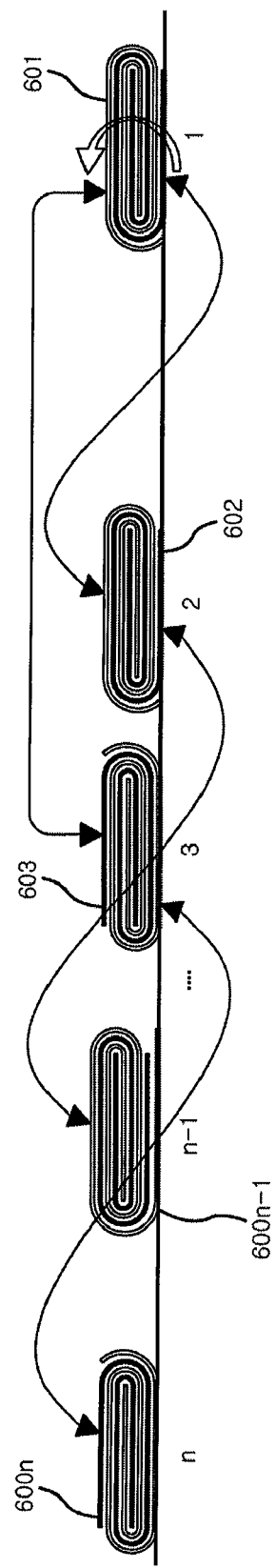
FIGS. 13 and 14 are typical views illustrating the electrode facing relationships during the stacking process of the cell units through the winding operation of the cell units based on the arrangement of FIG. 10 and the arrangement of FIG. 12, respectively.
Figure 14:
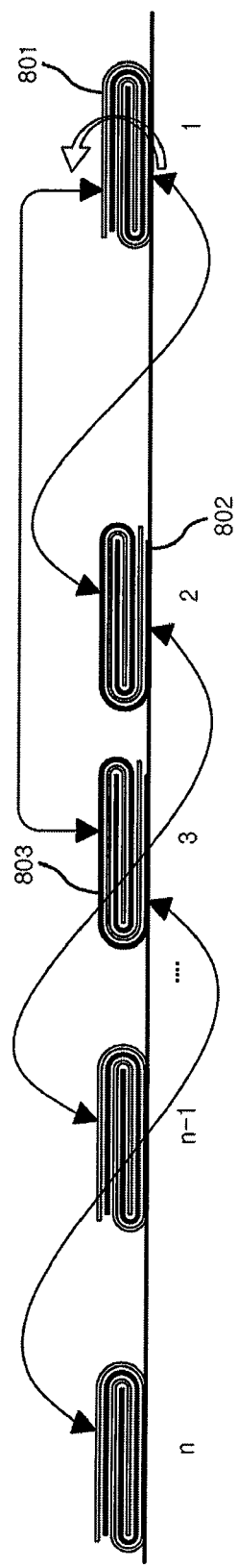

For clearer understanding about the above-described arrangement modes, the electrode facing relationships during the stacking process of the cell units through the winding operation of the cell units based on the arrangement of FIG. 10 and the arrangement of FIG. 12 are illustrated respectively in FIGS. 13 and 14.

Referring first to FIG. 13, the first cell unit 601 and the second cell unit 602 are wound while the first cell unit 601 and the second cell unit 602 are spaced apart by a distance corresponding to the width of one cell unit. As a result, the upper end electrode (anode) of the first cell unit 601 is brought into contact with the upper end electrode (cathode) of the third cell unit 603. Also, the lower end electrode (cathode) of the first cell unit 601 is brought into contact with the upper end electrode (anode) of the second cell unit 602. Consequently, when the first cell unit 601 is an Aa-type cell unit, the second cell unit 602 must be an Aa-type cell unit or a Ba-type cell unit, and the third cell unit 603 must be an Ac-type cell unit or a Bc-type cell unit.

On the other hand, the second cell unit and the following cell units 602, 603 . . . are sequentially stacked without a distance corresponding to the width of one cell unit. As a result, the lower end electrode (cathode) of the second cell unit 602 is brought into contact with the upper end electrode (anode) of the fourth cell unit, and the lower end electrode (anode) of the third cell unit 603 is brought into contact with the upper end electrode (cathode) of the fifth cell unit. Consequently, it is necessary for the cell units to be alternately arranged two by two, and therefore, the second cell unit 602 must be an Aa-type cell unit, and the third cell unit 603 must be an Ac-type cell unit.

Meanwhile, the lower end electrode of the $n^{th}$ cell unit 600$n$ and the lower end electrode of the n-$1^{th}$ cell unit 600$n$-1 form the outer surface of the electrode assembly at the final position. Preferably, therefore, the lower end electrode of the $n^{th}$ cell unit 600$n$ and the lower end electrode of the n-$1^{th}$ cell unit 600$n$-1 are anodes.

Referring now to FIG. 14, the upper end electrode (anode) of the first cell unit 801 is brought into contact with the upper end electrode (cathode) of the third cell unit 803, and the lower end electrode (anode) of the first cell unit 801 is brought into contact with the upper end electrode (cathode) of the second cell unit 802. Consequently, when the first cell unit 801 is a Ba-type cell unit, the second cell unit 802 and the third cell unit 803 must be an Ac-type cell unit or a Bc-type cell unit.

Also, in the same principle as the previous description, the lower end electrode of the second cell unit 802 is brought into contact with the upper end electrode of the fourth cell unit, and the lower end electrode of the third cell unit 903 is brought into contact with the upper end electrode of the fifth cell unit. Consequently, the electrodes at the interfaces therebetween must have different polarities, and therefore, the second cell unit 802 and the third cell unit 803 must be a Bc-type cell unit.

An exemplary electrode assembly manufactured by the process described above is typically illustrated in FIG. 15.

Figure 15:
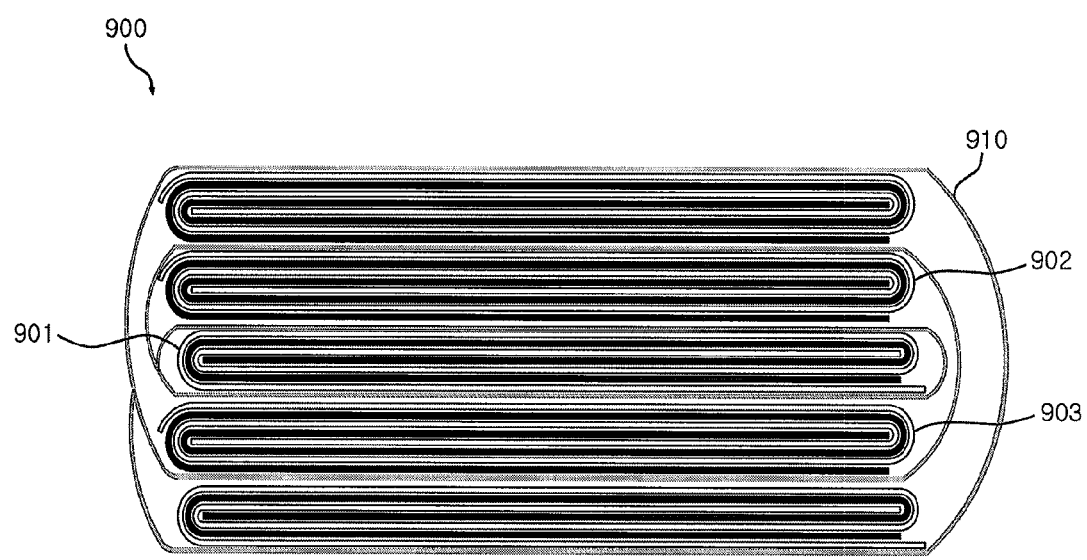
FIG. 15 is a vertical sectional view typically illustrating an electrode assembly according to an embodiment of the present invention.

Referring to FIG. 15, various kinds of unit cells 901, 902, 903 . . . are sequentially wound, while the unit cells 901, 902, 903 . . . are arranged on a separator sheet 901 in a specific combination, to constitute an electrode assembly 900. The separator sheet 901 has a length sufficient to cover the electrode assembly 900 once after the completion of the winding process.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the above description, the electrode assembly according to the present invention is manufactured with a high productivity equivalent to that of the conventional jelly-roll type electrode assembly. Furthermore, the electrode assembly according to the present invention exhibits a high operational efficiency and safety equivalent to the conventional stacking type or stacking/folding type electrode assembly even after the electrode assembly according to the present invention is used for a long period of time.

What is claimed is:

1. A double winding type electrode assembly constructed in a structure in which a cathode and an anode are opposite to each other while a separator is disposed between the cathode and the anode, wherein
the electrode assembly is manufactured by preparing a plurality of cell units, each cell unit having a cathode sheet and an anode sheet, of a predetermined size, wound, while a separator is disposed between the cathode sheet and the anode sheet, each cell unit being elliptical in section, and sequentially winding the cell units while arranging the cell units on a long separator sheet.

2. The electrode assembly according to claim 1, wherein the separator, disposed between the cathode and the anode, extends longer than the outer winding end of each electrode.

3. The electrode assembly according to claim 1, wherein the number of winding times of each cell unit is 1 to 5 based on the number of bending times of the respective electrode sheets in the elliptical structure.

4. The electrode assembly according to claim 1, wherein, when the winding process is performed to manufacture of each cell unit, the inside winding end of the cathode and the inside winding end of the anode are located at approximately the same winding start point, or the inside winding end of the cathode and the inside winding end of the anode are opposite to each other at the winding start point.

5. The electrode assembly according to claim 1, wherein each cell unit is a cell unit constructed in a structure in which the upper end electrode and the lower end electrode have different polarities (A-type cell unit) or a cell unit constructed in a
structure in which the upper end electrode and the lower end electrode have the same polarity (B-type cell unit).

6. The electrode assembly according to claim 5, wherein the A-type cell unit is constructed in a structure in which the outside winding end of the cathode and the outside winding end of the anode are located on the same plane or a structure in which the outside winding end of the cathode and the outside winding end of the anode are not located on the same plane.

7. The electrode assembly according to claim 6, wherein opposite round sides of each cell unit are surrounded by the anode sheet.

8. The electrode assembly according to claim 5, wherein the B-type cell unit is constructed in a structure in which the anode forms the outer winding surface or a structure in which the cathode forms the outer winding surface.

9. The electrode assembly according to claim 8, wherein the outside winding end of the anode constituting the B-type cell unit extends longer than the outside winding end of the cathode constituting the B-type cell unit.

10. The electrode assembly according to claim 1, wherein the first cell unit, with which the winding process is initiated, and the second cell unit, among the cell units arranged on the separator sheet, are spaced apart, by a length sufficient such that the lower end electrode of the first cell unit is brought into contact with the upper end electrode of the second cell unit after the outer surface of the first cell unit is completely covered by the separator sheet during the winding process, from each other.

11. The electrode assembly according to claim 10, wherein the cell units are wound in a structure in which the upper end electrode of the first cell unit and the upper end electrode of the third cell unit have opposite polarities, the lower end electrode of the second cell unit and the upper end electrode of the fourth cell unit have opposite polarities, and the lower end electrode of the third cell unit and the upper end electrode of the fifth cell unit have opposite polarities.

12. The electrode assembly according to claim 1, wherein the lower end electrode of the last cell unit on the separator sheet ($n^{th}$ cell unit) and the lower end electrode of the $n-1^{th}$ cell unit adjacent to the $n^{th}$ cell unit are anodes, respectively.

13. The electrode assembly according to claim 11, wherein the first cell unit and the second cell unit are A-type cell units whose upper end electrodes are cathodes (Ac-type cell units), the third cell unit is an A-type cell unit whose upper end electrode is an anode (Aa-type cell unit), the fourth cell unit and the following cell units are sequentially disposed in a structure in which the Ac-type cell units and the Aa-type cell units are alternately arranged, and the $n^{th}$ cell unit is a B-type cell unit whose outer surface is an anode (Ba-type cell unit).

14. The electrode assembly according to claim 11, wherein the first cell unit and the second cell unit are Aa-type cell units, the third cell unit is an Ac-type cell unit, the fourth cell unit and the following cell units are sequentially disposed in a structure in which the Aa-type cell units and the Ac-type cell units are alternately arranged, the $n-1^{th}$ cell unit is a Ba-type cell unit, and the $n^{th}$ cell unit is an Ac-type cell unit.

15. The electrode assembly according to claim 11, wherein the first cell unit is a Ba-type cell unit, the second cell unit and the third cell unit are B-type cell units whose outer surfaces are cathodes (Bc-type cell units), the fourth cell unit and the following cell units are sequentially disposed in a structure in which the Bc-type cell units and the Ba-type cell units are alternately arranged two by two, and the $n-1^{th}$ cell unit and the n" cell unit are Ba-type cell units, respectively.

16. The electrode assembly according to claim 1, wherein the number of cell units is 2 to 10.

17. The electrode assembly according to claim 1, wherein the cell units are bonded to the separator sheet before the commencement of the winding process.

18. The electrode assembly according to claim 1, wherein the separator of each cell unit is coated with a binder, and the separator is bonded to the electrodes to maintain the elliptical structure in section.

19. A secondary battery including the electrode assembly according to claim 1.

20. The secondary battery according to claim 19, wherein the secondary battery is a lithium secondary battery.

21. A middle- or large-sized battery module including the secondary battery according to claim 19 as a unit cell.

* * * * *